(12) United States Patent
Song et al.

(10) Patent No.: US 6,882,479 B2
(45) Date of Patent: Apr. 19, 2005

(54) WEARABLE DISPLAY SYSTEM

(75) Inventors: Young-ran Song, Gyeonggi-do (KR); Seok-ho Song, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 86 days.

(21) Appl. No.: 10/016,685

(22) Filed: Dec. 17, 2001

(65) Prior Publication Data
US 2002/0122015 A1 Sep. 5, 2002

Related U.S. Application Data

(60) Provisional application No. 60/257,283, filed on Dec. 26, 2000, and provisional application No. 60/255,448, filed on Dec. 15, 2000.

(30) Foreign Application Priority Data
Jan. 10, 2001 (KR) .......................................... 2001-1350

(51) Int. Cl.⁷ ............................ G02B 27/14; G09G 5/00
(52) U.S. Cl. ............................ 359/630; 359/631; 345/7; 345/8; 345/9
(58) Field of Search ................................. 359/629–634, 359/637, 15, 558, 566, 556; 345/6–9; 385/133, 146, 33, 36, 37

(56) References Cited

U.S. PATENT DOCUMENTS

| | | | |
|---|---|---|---|
| 4,711,512 A | | 12/1987 | Upatnieks ........................ 345/7 |
| 5,224,198 A | * | 6/1993 | Jachimowicz et al. ...... 385/133 |
| 5,455,693 A | | 10/1995 | Wreede et al. ................. 359/15 |
| 5,682,255 A | | 10/1997 | Friesem et al. ................ 359/15 |
| 5,724,163 A | | 3/1998 | David ........................... 359/15 |
| 5,812,186 A | | 9/1998 | Telfer et al. ................... 348/54 |
| 5,856,842 A | | 1/1999 | Tedesco .................... 348/14.16 |
| 6,577,411 B1 | * | 6/2003 | David ........................... 359/19 |

FOREIGN PATENT DOCUMENTS

| | | |
|---|---|---|
| EP | 0 535 402 A1 | 4/1993 |
| EP | 0595705 | 5/1994 |
| GB | 2044476 | 10/1980 |
| JP | 5-304645 | 11/1993 |
| JP | 10-301055 | 11/1998 |
| JP | 2000-056259 | 2/2000 |
| JP | 2000-267041 | 9/2000 |
| KR | 1995-7004722 | 11/1995 |
| WO | WO 98/21612 | 5/1998 |
| WO | WO 00/55676 | 9/2000 |

* cited by examiner

Primary Examiner—Hung Xuan Dang
Assistant Examiner—Joseph Martinez
(74) Attorney, Agent, or Firm—Staas & Halsey LLP

(57) ABSTRACT

A wearable display system having a display panel to output a signal processed in a predetermined way. The system includes at least one waveguide to guide propagation of at least one signal output from at least one display panel, a plurality of gratings to diffract the at least one signal propagating through the at least one waveguide, and at least one magnifying lens to magnify the at least one signal diffracted by the gratings. A lightweight and compact wearable display system is realized by minimizing the number of optical components, and the complexity and cost of manufacturing the display system is reduced. In addition, the display system is produced on a large scale by incorporating a waveguide, gratings and an eyepiece into one single body, and further, chromatic aberration is removed by conjugate gratings.

41 Claims, 19 Drawing Sheets

WEARABLE DISPLAY SYSTEM

CROSS-REFERENCE TO RELATED APPLICATIONS

This application claims the benefit of Korean Application No. 2001-1350, filed Jan. 10, 2001, in the Korean Industrial Property Office, the disclosure of which is incorporated herein by reference. This application also claims the benefit of U.S. Provisional Application Nos. 60/255,448, filed Dec. 15, 2000 and 60/257,283, filed Dec. 26, 2000.

BACKGROUND OF THE INVENTION

1. Field of the Invention

The present invention relates to personal display systems, and more particularly, to a wearable display system capable of transmitting a display signal through an eyeglass-type or goggle-type optical device to be displayed at a location near an eye of a user.

2. Description of the Related Art

Conventional optical display systems used in the military, in medicine or for personal entertainment have been designed for users to see video signals via an eyeglass-type, goggle-type or helmet-type wearable device. These personal display systems allow the users to receive video information while moving from place to place. FIG. 1 shows one example of a conventional HMD. Referring to FIG. 1, the HMD is made of eyeglasses 100 and an image-driving unit 200 that is attached to the center of the eyeglasses 100. The driving unit 200 is bulky, heavy and unpleasant in appearance. The large volume and heavy weight of the image-driving unit 200 is due to the many optical elements constituting the unit.

FIG. 2 is a block diagram illustrating the structure of a conventional HMD. In FIG. 2, the HMD comprises the image driving unit 200, a display panel 210 and an optical system 220. The image driving unit 200 stores a signal received from exterior sources such as a personal computer or a video device (not shown) and processes the received signal to display it on the display panel 210, such as a liquid crystal display (LCD) panel. The optical system 220 generates a virtual image in the eye of a user from the signal displayed on the display panel 210. This is done via an image-enlarging optical system. The HMD can further include other head-mounted devices or a cable for receiving signals from an external source.

FIG. 3 shows the general structure of the optical system 220 of the conventional HMD of FIG. 2. The conventional optical system 220 is composed of a collimating lens 300, an X prism 310, focusing lenses 320, fold mirrors 330 and ocular lenses (or magnifying lenses) 340. The collimating lens 300 collimates the light (a signal) emitted from the display panel 210 or the like. The X prism 310 redirects light received from the collimating lens 300 in the right and left directions. The focusing lenses 320 are separately placed on the right and left sides of the X prism 310 to focus collimated light redirected by the X prism 310. The fold mirrors 330 reflect the light focused by the focusing lenses 320 toward the eyes of the user. The ocular lenses (or magnifying lenses) 340 allow small signals passing through the above-described optical elements to appear as a virtual image in the eyes of the user. At this time, if the light propagating through the optical system 220 is polychromatic, lenses for removing chromatic aberration must be used as the ocular lenses 340.

In the conventional HMD wearable display system, the optical system 220 employs several precisely designed optical elements, such as the collimating lens, the X prism, the focusing lenses, the fold mirrors, the ocular lenses, and the like, as described above. For this reason, it is difficult to manufacture the conventional HMD wearable display system because much effort and time are required. Even if the lenses and the other elements are designed precisely, additional difficulties in aligning the lenses and the other elements may occur. Moreover, a special eyepiece must be additionally designed to remove chromatic aberration of a color signal. Therefore, the conventional HMD wearable display system is expensive to manufacture. In addition, the conventional optical system 220 is bulky and heavy, therefore making the system uncomfortable for the user.

SUMMARY OF THE INVENTION

Accordingly, it is an object of the present invention to provide a wearable display system that is simple to manufacture, removes chromatic aberration using gratings and realizes three-dimensional images.

Additional objects and advantages of the invention will be set forth in part in the description which follows and, in part, will be obvious from the description, or may be learned by practice of the invention.

The foregoing and other objects of the present invention are achieved by providing a wearable display system having a display panel to output a signal processed in a predetermined way. The system comprises a waveguide to guide the propagation of the signal output from the display panel; a plurality of gratings to diffract the signal propagating through the waveguide, and a magnifying lens to magnify the signal diffracted by one of the gratings.

The plurality of gratings may comprise a first grating to diffract the signal output from the display panel so that the signal propagates through the waveguide, and a second grating to diffract the signal propagating through the waveguide after being diffracted by the first grating.

The plurality of gratings may also comprise a first grating to reflect the signal output from the display panel and incident on the first grating at a predetermined incidence angle, at a predetermined reflection angle, and a second grating to reflect the signal propagating through the waveguide and incident upon the second grating at the same angle as the predetermined reflection angle at the first grating, at the same angle as the predetermined incidence angle.

The plurality of gratings may also comprise a first grating to transmit the signal output from the display panel and incident on the first grating at a predetermined incidence angle, at a predetermined transmission angle to propagate through the waveguide, and a second grating to transmit the signal propagating through the waveguide and incident upon the second grating at the same angle as the predetermined transmission angle at the first grating, at the same angle as the predetermined incidence angle at the first grating.

The plurality of gratings may also comprise a first grating to reflect the signal output from the display panel and incident on the first grating at a predetermined incidence angle, at a predetermined reflection angle, and a second grating to transmit the signal propagating through the waveguide and then incident upon the second grating at the same angle as the predetermined reflection angle at the first grating, at the same angle as the predetermined incidence angle at the first grating.

The plurality of gratings may also comprise a first grating to transmit at least one signal output from the display panel and incident upon the first grating at a predetermined incidence angle, at a predetermined transmission angle, and a second grating to reflect the signal propagating through the waveguide and incident upon the second grating at the same angle as the predetermined transmission angle at the first grating, at the same angle as the predetermined incidence angle at the first grating.

The wearable display system further comprises a shutter to alternately block a signal in the waveguide to produce a three-dimensional image. The magnifying lens is movable along a predetermined length of the waveguide.

The waveguide is made of glass or plastic or particularly, acryl substance (PMMA). The gratings and the waveguide may be incorporated into one single-body. Also, the magnifying lens and the waveguide may be incorporated into one single-body. Also, the gratings and the magnifying lens may be incorporated into one single-body. The magnifying lens is formed with a holographic optical element (HOE) or a diffraction optical element (DOE).

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE INVENTION

Figure 1:
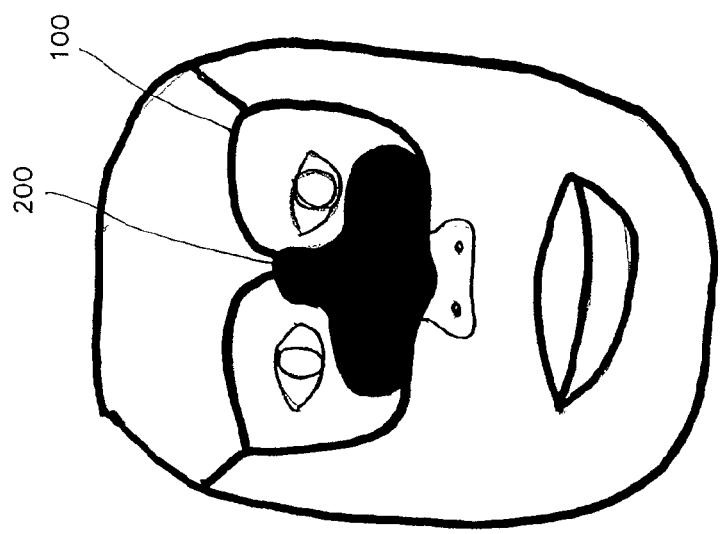
FIG. 1 is an exterior view of a conventional head mounted display (HMD)
Figure 2:
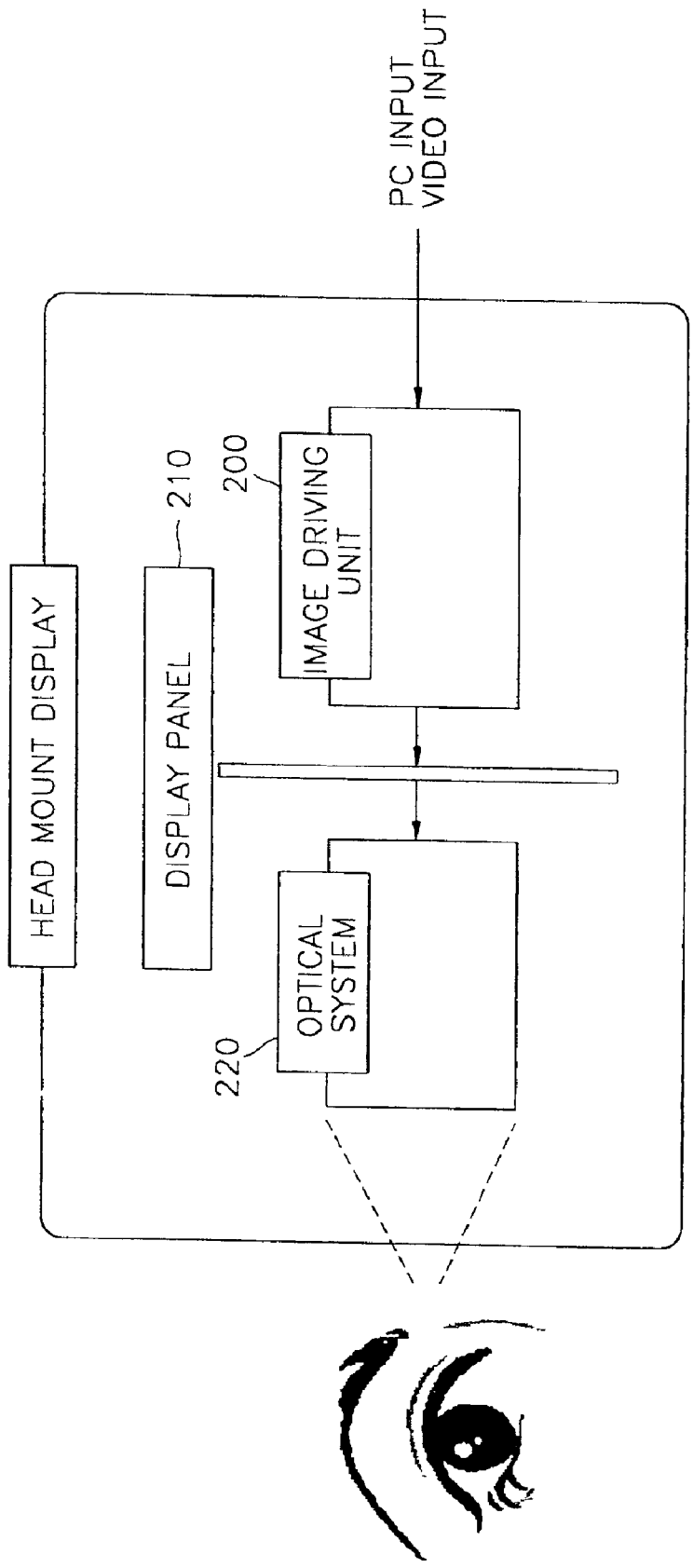
FIG. 2 is a schematic diagram of a conventional HMD.
Figure 3:
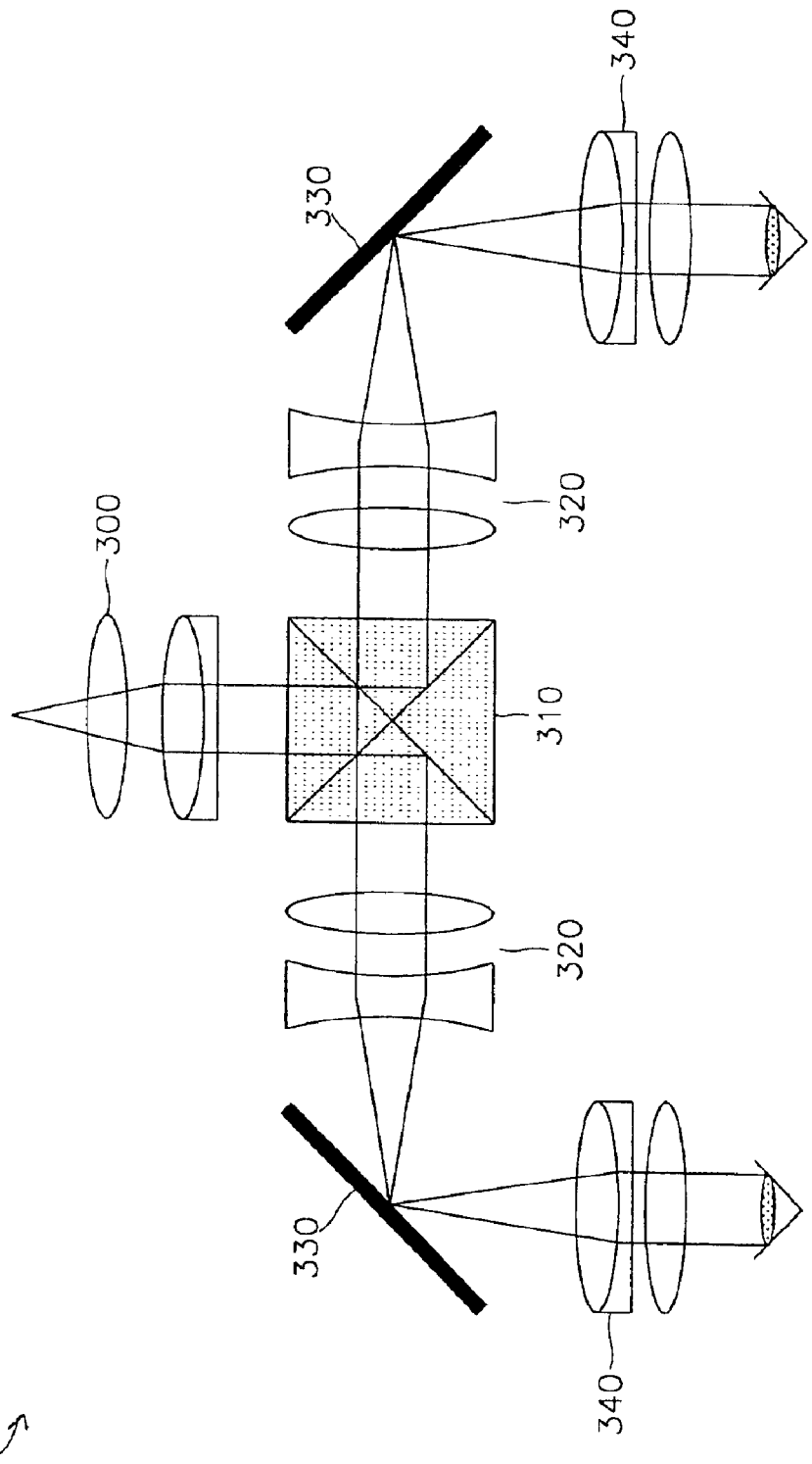
FIG. 3 is a schematic diagram of the optical system of the conventional HMD of FIG. 2.

Reference will now be made in detail to the present preferred embodiments of the present invention, examples of which are illustrated in the accompanying drawings, wherein like reference numerals refer to like elements throughout.

Figure 4A:
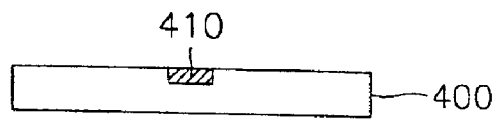
FIGS. 4A and 4B show wearable display systems according to the present invention.
Figure 4B:
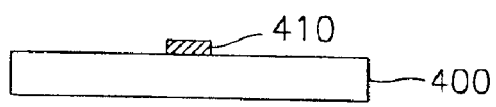

FIGS. 4A and 4B are a view of the front and of the top of a wearable display system according to the present invention, respectively. In FIGS. 4A and 4B, the wearable display system has a simple structure in which a lens 400 and a display panel 410 are combined together. The wearable display system according to the present invention has a thin, light and small structure as compared to the conventional art due to the use of gratings and a magnifying lens. Thus, the wearable display system according to the present invention is easy and convenient to wear (like eyeglasses), unlike existing bulky and heavy helmet-type HMDs. Further, the present invention provides a wearable display system having a module structure in which the module is attachable/detachable to conventional eyeglasses. The exterior of the wearable display system illustrated in FIGS. 4A and 4B is just an example, and a variety of thin, light and small wearable display systems having different exteriors can be realized.

A wearable display system according to the present invention can be manufactured as a binocular type or a monocular type. A binocular type is designed for a user to look at a display image using both of his or her eyes, whereas a monocular type allows the user to look at the display image using only one of his or her eyes. In the case of the binocular type, a three-dimensional image (3D) display can be achieved.

Figure 5:
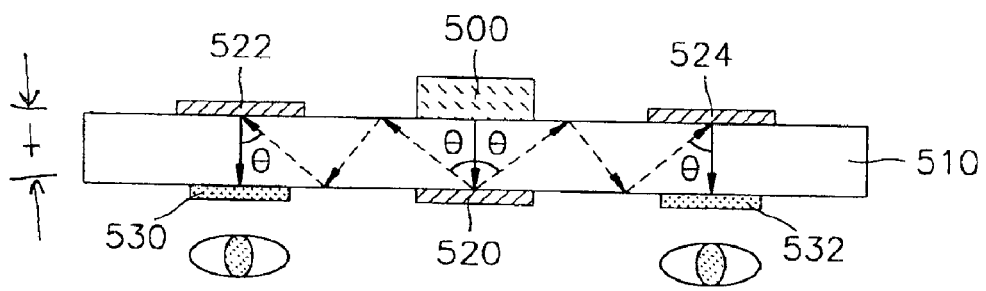
FIG. 5 is a schematic diagram of an embodiment of the wearable display system according to the present invention.

First, a binocular wearable display system will be described. FIG. 5 is a schematic diagram of an embodiment of a wearable display system according to the present invention. The wearable display system comprises a display panel 500, a waveguide 510, first, second and third gratings 520, 522 and 524, and magnifying lenses 530 and 532. The display panel 500 outputs a signal received from a predetermined signal source (not shown) via wire or radio (not shown). The waveguide 510 guides the propagation of light emitted from the display panel 500. The first, second and third gratings 520, 522 and 524 diffract the light passing through the waveguide 510 so that the light can ultimately travel toward the eyes of a user. The magnifying lenses 530 and 532 allow the user to see a magnified image by magnifying the light coming from the waveguide 510.

In FIG. 5, when light emitted from the display panel 500 is incident upon the waveguide 510 at a predetermined angle, the first grating 520, diffracts the incident light down the waveguide 510 in both directions so that the incident light has a total internal reflection angle θ in the waveguide 510. The first grating 520 is installed opposite to the display panel 500, at the area of the waveguide where light is first incident. The total internal reflection angle θ is calculated by Equation (1):

$$\theta = \sin^{-1}\left(\frac{1}{n}\right) \quad (1)$$

wherein the numeral 1 is the refractive index of air and n is the refractive index of the material of the waveguide 510.

The path of light traveling in the waveguide 510 must be shorter than a focal distance f of the magnifying lenses 530 and 532 installed in front of the user's eyes. For instance, if t is the thickness of the waveguide 510, n×t must be shorter than the focal distance f. However, the size of the display panel 500 and the focal distance and size of the magnifying lenses 530 and 532 must be chosen according to the desired size of a magnified image. The desired size will depend on the purpose of the wearable display system. Then, the entire structure of the waveguide 510 is designed and the type and thickness thereof and the number of times reflection occurs are determined based on this purpose. The first grating 520 and the second grating 522, and the first grating 520 and the third grating 524, have a conjugate relationship, respectively. That is, the second and third gratings 522 and 524 diffract incident light at the same predetermined angle at which light is incident on the first grating 520, provided the angle at which light is incident on each of the second and third gratings 522 and 524 is the same as the angle at which light is diffracted by the first grating 520. At that time, the second grating 522 is the same as the third grating 524. In the embodiment relating to FIG. 5, a wearable display system having one display panel and three gratings is described, but the numbers of gratings and display panels are not limited in the present invention.

Figure 6:
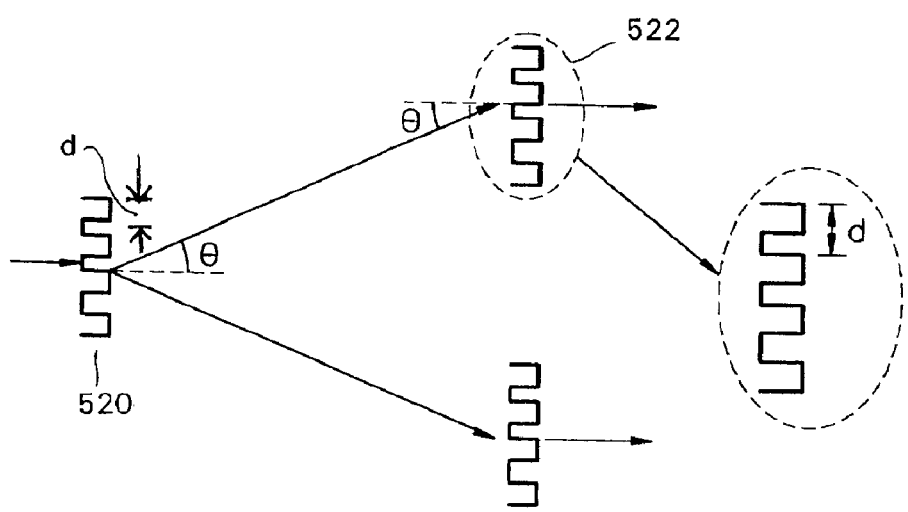
FIG. 6 illustrates an example for explaining a conjugate relationship between gratings of the present invention.

FIG. 6 shows an example of the conjugate relationship between the gratings described above. The first and second gratings 520 and 522 must have the same grating space d and must be positioned parallel to the waveguide 510.

Figure 7A:
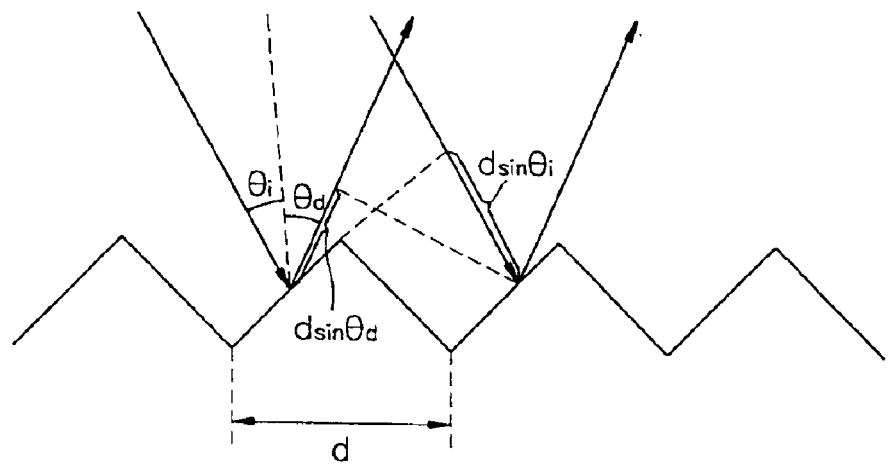
FIG. 7A illustrates an example of a grating of the present invention.

FIG. 7A illustrates an example of the diffraction principle of a grating. Provided that an incidence angle is $\theta_i$, a diffraction angle is $\theta_d$ and a pitch of a grating is d, the following equation (2) is obtained:

$$(\sin\theta_d - \sin\theta_i) = m\frac{\lambda}{d} \quad (2)$$

wherein m is a diffraction order and λ is the wavelength of incident light. A diffraction angle can be controlled by varying the shape and characteristics of the grating. At that time, if light diffracted from the grating propagates into the waveguide, the diffraction angle of light must satisfy the condition of the total internal reflection angle θ.

Figure 7B:
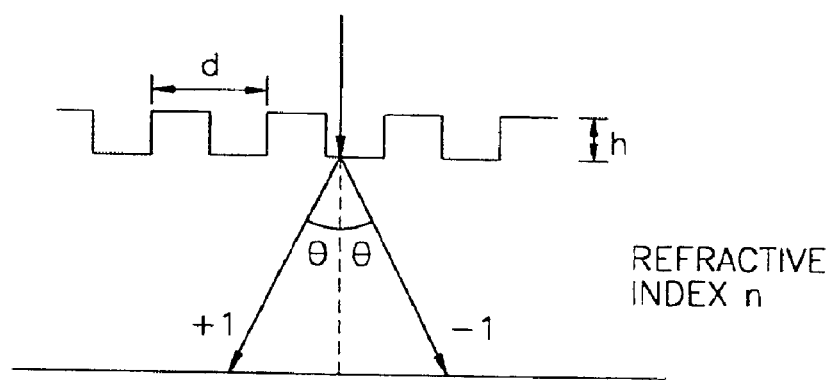
FIGS. 7B and 7C illustrate a transmission type grating and a reflection type grating of the present invention, respectively.
Figure 7C:
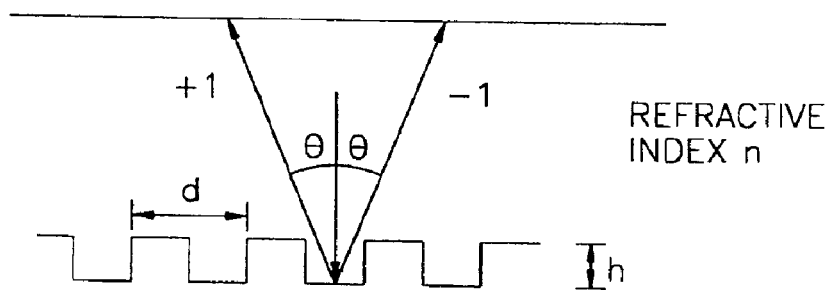

FIGS. 7B and 7C illustrate a transmission-type grating and a reflection-type grating, respectively. The transmission-type grating in FIG. 7B bends incident light by θ and transmits it in both directions. For example, light diffracted in the left direction is +1 and light diffracted in the right direction is −1. The plus/minus sign denotes left/right directions and '1' indicates the diffraction order to be '1'. The reflection-type grating in FIG. 7C reflects incident light by θ in both directions. In FIGS. 7B and 7C, the variable 'h' represents a height of the gratings.

Figure 8A:
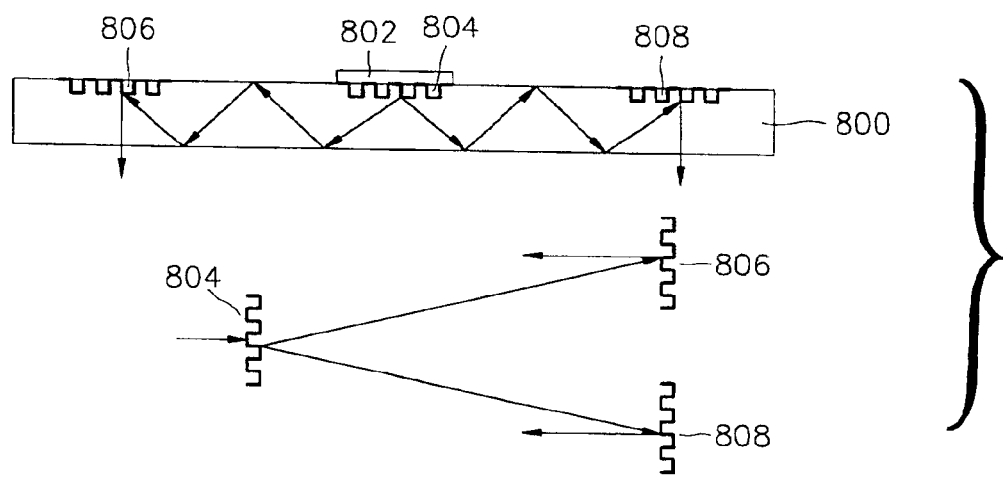
FIGS. 8A to 8H show various possible embodiments of a wearable display system of the present invention according to the types of gratings and the arrangement of the gratings on a waveguide.

FIG. 8A shows the structure of a wearable display system having a waveguide on which a display panel 802 and first, second and third gratings 804, 806 and 808 are positioned opposite to the side of the eyes of a user. Light emitted from the display panel 802 at a predetermined angle is bent and transmitted in both directions of the waveguide 800 via the first grating 804, and is incident on the second grating 806 and the third grating 808, which have a conjugate relationship with the first grating 804, at the same incidence angle as the diffraction angle of the first grating 804. The light incident on the second and third gratings 806 and 808 is reflected at the same angle as the incidence angle on the first grating 804 and heads toward the eyes of the user. Magnifying lenses (not shown) are installed on the left and right faces of the waveguide 800 where the reflected light reaches, and the user can look at a magnified signal via the magnifying lenses. From this embodiment, it is noted that the first grating 804 is a transmission type and the second and third gratings 806 and 808 are reflection type.

Figure 8B:
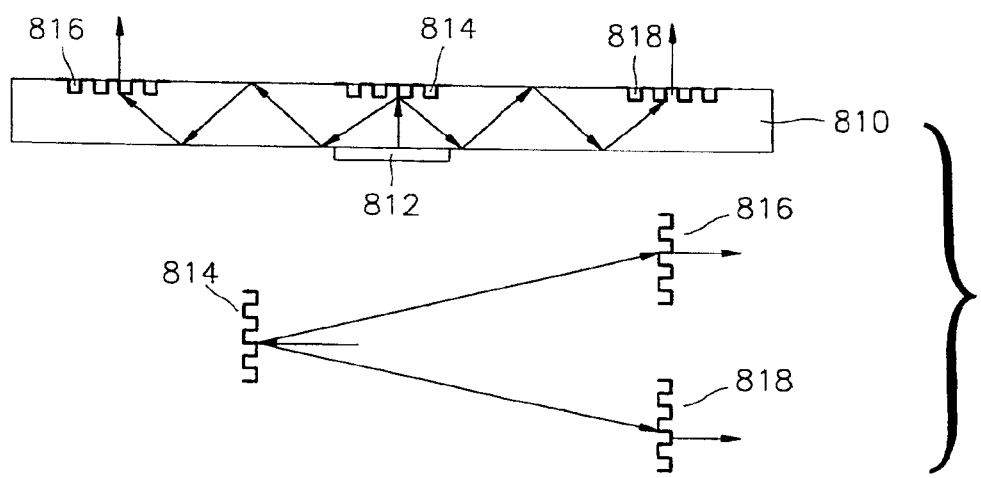

FIG. 8B shows a wearable display system in which a display panel 812 is installed on the opposite side of the eyes of the user and first, second and third gratings 814, 816 and 818 are disposed on the side of the waveguide 810 through which a signal is transmitted to the eyes of the user. Light that is incident on the first grating 814 within the waveguide 810 is reflected in both directions at a predetermined angle. The reflected light propagates in the waveguide 810 and is incident on the second and third gratings 816 and 818, which have a conjugate relationship with the first grating 814, at the same angle as the predetermined angle by which light is diffracted by the first grating 814. The incident light is transmitted by the second and third gratings 816 and 818 at the same angle as a predetermined incidence angle at the first grating 814, and travels toward the eyes of the user. Predetermined magnifying lenses (not shown) are mounted on the second and third gratings 816 and 818, and magnify the transmitted signal. From this embodiment, the first grating 814 is a reflection type grating and the second and third gratings 816 and 818 are transmission type gratings.

Figure 8C:
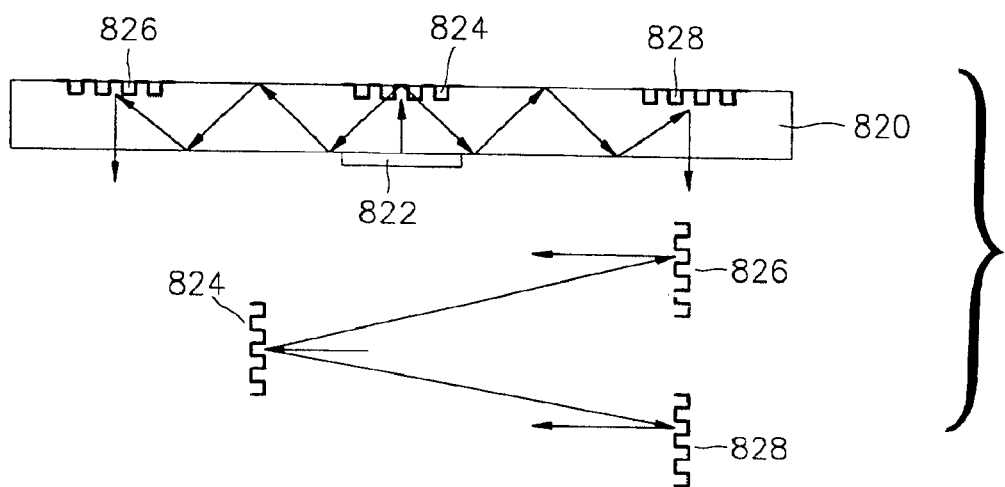

FIG. 8C shows the structure of a wearable display system where a display panel 822 is installed on the side of the eyes of a user and first, second and third gratings 824, 826 and 828 are installed on the side of the waveguide 820 opposite to the side through which a signal is transmitted to the eyes of the user. Light that is incident upon the first grating 824 from the display panel 822 via the waveguide 820 at a predetermined incidence angle is reflected at a predetermined reflection angle at the first grating 824 in both directions. The reflected light propagates in the both directions of the waveguide 820 and is incident on the second and third gratings 826 and 828, which have a conjugate relationship with the first grating 824, at the same angle as the reflection angle of the first grating 824. The light incident on the second and third gratings 826 and 828 is reflected at the same angle as the incidence angle at the first grating 824, and propagates toward the eyes of the user. On both faces of the waveguide 820 where the reflected light reaches, magnifying lenses (not shown) are installed, so that the user can view a magnified signal. In this embodiment, the first, second and third gratings 824, 826 and 828 are reflection type gratings.

Figure 8D:
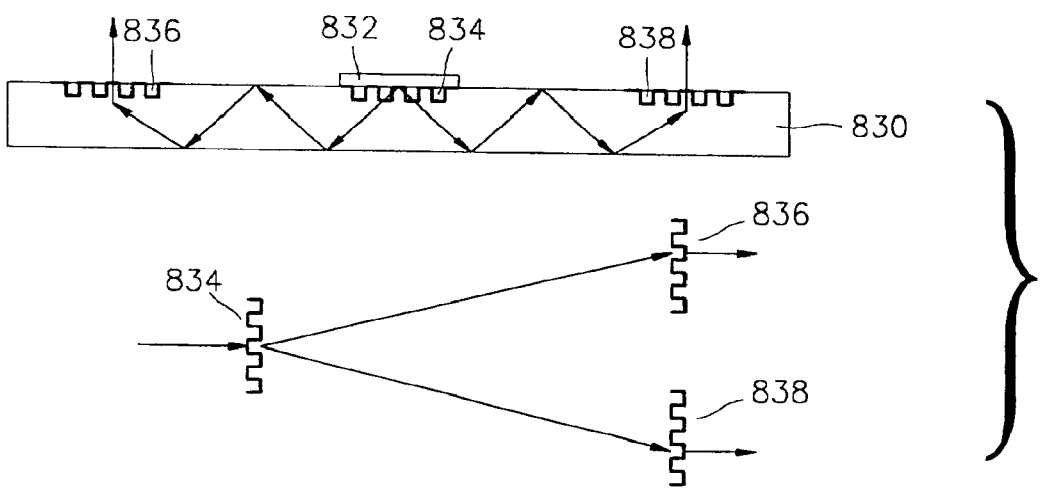

FIG. 8D shows the structure of a wearable display system having a display panel 832 and first, second and third gratings 834, 836 and 838 on a waveguide 830 on the side of the eyes of a user. The light of a signal, which is incident on the first grating 834 from the display panel 832 at a predetermined incidence angle, is transmitted at a predetermined transmission angle in both directions within the waveguide 830. The transmitted light propagates in the waveguide 830 and then is incident on the second and third gratings 836 and 838, which are conjugates of the first grating 834, at the same angle as the transmission angle at the first grating 834. The incident light is transmitted through the faces of the second and third gratings 836 and 838 at the same angle as the predetermined incidence angle at the first grating 834 and propagates toward the eyes of the user. Magnifying lenses (not shown) attached to the second and third gratings 836 and 838 magnify a signal to be transmitted. In this embodiment, the first, second and third gratings 834, 836 and 838 are all transmission type gratings.

Figure 8E:
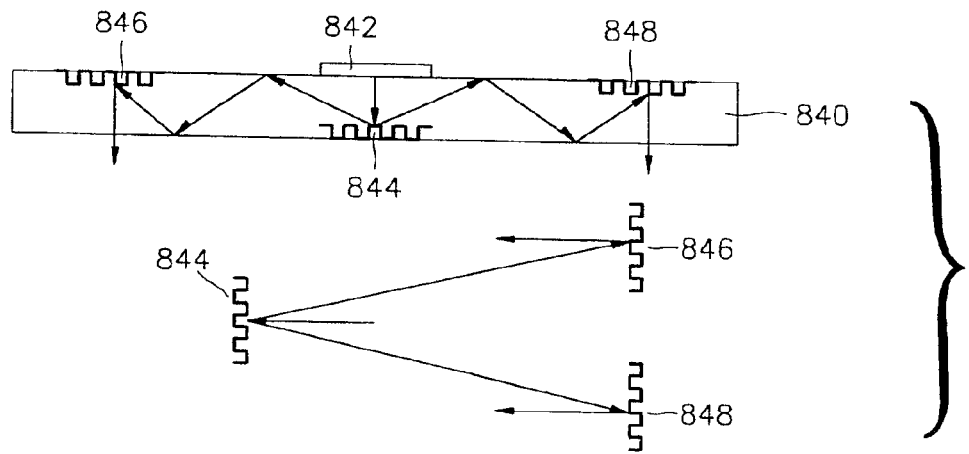

FIG. 8E illustrates the structure of a wearable display system in which a display panel 842 and second and third gratings 846 and 848 are placed on the opposite side of the eyes of a user and a first grating 844 is positioned on the side of the waveguide 840 through which a signal is transmitted to the eyes of the user. Light, which is generated from the display panel 842 and is incident on the first grating 844 via the waveguide 840 at a predetermined incidence angle, is reflected from the first grating 844 in both directions at a predetermined reflection angle. The reflected light propagates in the left/right directions of the waveguide 840 and then is incident on the second and third gratings 846 and 848, which are conjugates of the first grating 844, at the same angle as the reflection angle at the first grating 844. The incident light is reflected from the second and third gratings 846 and 848 at the same angle as the predetermined incidence angle at the first grating 844, and then propagates toward the eyes of the user. Magnifying lenses (not shown) attached to the waveguide 840 allow the user to view a magnified signal. In this embodiment, the first, second and third gratings 844, 846 and 848 are all reflection type gratings.

Figure 8F:
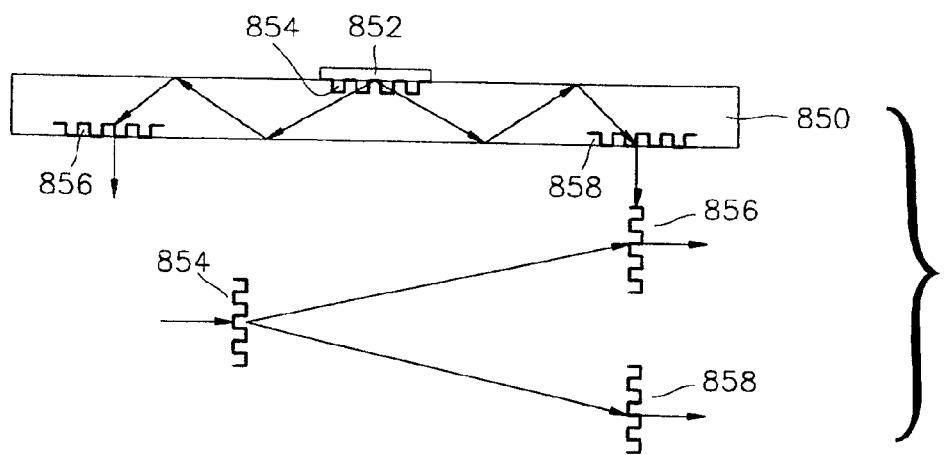

FIG. 8F shows a wearable display system in which a display panel 852 and a first grating 854 are placed on the opposite side of the eyes of a user and second and third gratings 856 and 858 are installed on the side of the waveguide 850 through which a signal is transmitted to the eyes of the user. The light of a signal that is incident upon the first grating 854 from the display panel 852 is transmitted at a predetermined transmission angle in the left and right directions of the waveguide 850. The transmitted light propagates in the waveguide 850 and then is incident upon the second and third gratings 856 and 858, which are conjugates of the first grating 854, at the same angle as the transmission angle at the first grating 854. The incident light is transmitted through the faces of the second and third gratings 856 and 858 at the same angle as the predetermined incidence angle at the first grating 854 and then propagates toward the eyes of the user. Magnifying lenses (not shown) are attached to the second and third gratings 856, 858 and magnify the signal. In this embodiment, the first, second and third gratings 854, 856 and 858 are all transmission type gratings.

Figure 8G:
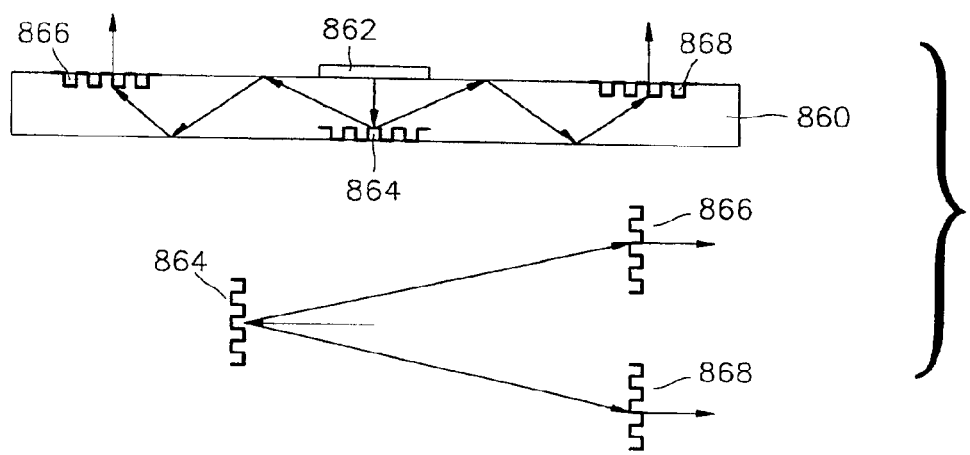

FIG. 8G shows a wearable display system in which a display panel 862 and second and third gratings 866 and 868 are placed on the side of the eyes of a user, and a first grating 864 is placed on the side of the waveguide 860 opposite to the side through which a signal is transmitted to the eyes of the user. The light emitted from the display panel 862 is incident upon the first grating 864 via the waveguide 860, and reflected at a predetermined angle in the left and right directions of the waveguide 860. The reflected light propagates in the waveguide 860 and is incident upon the second and third gratings 866 and 868, which are conjugates of the first grating 864, at the same incidence angle as the reflection angle at the first grating 864. The incident light is transmitted through the second and third gratings 866 and 868 at the same angle as the predetermined incidence angle at the first grating 864, and travels toward the eyes of the user. A magnifying lens (not shown) attached to the second and third gratings 866 and 868 magnifies the reflected signal. In this embodiment, the first grating 864 is a reflection type grating and the second and third gratings 866 and 868 are transmission type gratings.

Figure 8H:
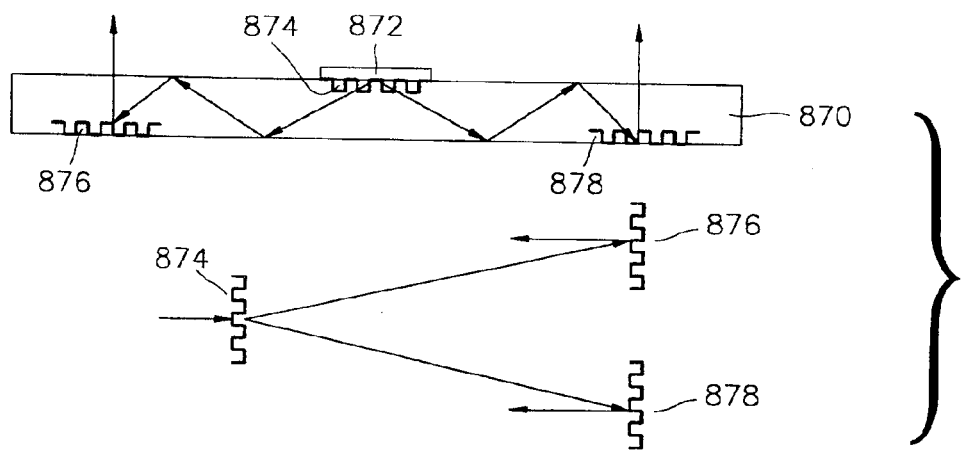

FIG. 8H shows a wearable display system in which a display panel 872 and a first grating 874 are placed on the side of the eyes of the user and second and third gratings 876, 878 are installed on the side of the waveguide 820 opposite to the side through which a signal is transmitted to the eyes of the user. The light emitted from the display panel 872 is incident upon the first grating 874 at a predetermined incidence angle and is then transmitted at a predetermined transmission angle in both directions of the waveguide 870 via the first grating 874. The light transmitted in the waveguide 870 propagates in the left and right directions of the waveguide 870 and then is incident upon the second and third gratings 876 and 878, which are conjugates of the first grating 874, at the same angle as the transmission angle at the first grating 874. The light that is incident on the second and third gratings 876 and 878 is reflected at the same angle as the incidence angle at the first grating 874 and propagates toward the eyes of the user. Magnifying lenses (not shown) are attached to the left and right sides of the waveguide 870 where the reflected light reaches and allows the user to look at a magnified signal. In this embodiment, the first grating 874 is a transmission type grating and the second and third gratings 876 and 878 are reflection type gratings.

As described above, it is noted that various types of wearable display systems can be realized depending on how a display panel and gratings are arranged on a waveguide. In the embodiments, as shown in FIGS. 8A, 8B, 8E and 8F, the display panel is located on the side of the waveguide opposite to the side through which a signal is transmitted to the eyes of a user.

Figure 9:
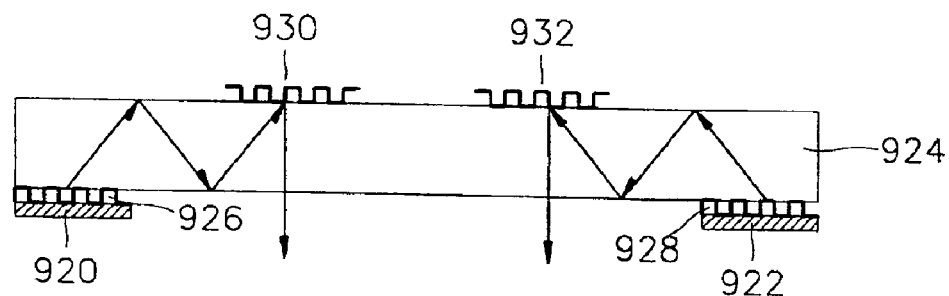
FIG. 9 shows another embodiment of a wearable display system according to the present invention.

FIG. 9 illustrates another embodiment of a wearable display system according to the present invention adopting two display panels. From the structure of this system, it is noted that display panels 920 and 922 are placed on the lower parts in the left and right directions of a waveguide 924, not the center thereof. First gratings 926 and 928 are installed parallel to the display panels 920 and 922, respectively. Second gratings 930 and 932, which are conjugates of the first gratings 926 and 928, are placed on the opposite direction of the eyes of a user near the center of the waveguide 924. Light of a signal emitting from the display panels 920 and 922 is transmitted in the waveguide 924 at a predetermined transmission angle via the first gratings 926 and 928, and the transmitted light is incident on the second gratings 930 and 932 at the same angle as the transmission angle. Light, which is incident on the second gratings 930 and 932, is reflected at the same angle as the incidence angle at the first gratings 926, 928 on the waveguide 924, and allows the reflected light to travel toward the eyes of the user. Magnifying lenses (not shown) are placed on the face of the waveguide 924, where the reflected light ultimately reaches, and magnify the image. In this embodiment, the first gratings 926 and 928 are transmission type gratings and the second gratings 930 and 932 are reflection type gratings. A variety of structures of wearable display systems can be created by different combinations of the elements included in FIG. 9, as wearable display systems of diverse structures are made by various combinations of the types and locations of the gratings and the positions of the display panels in FIGS. 8A–8H. FIGS. 8A through 9 show combinations of one or two display panels and a predetermined number of the gratings that are used in the display panels, but the numbers of the display panels and the gratings can be increased depending on the design. In this case, numerous different structures of wearable display systems can be derived by various combinations of the types and positions of the gratings and the position of the display panels as shown in FIGS. 8A–8H.

Figure 10A:
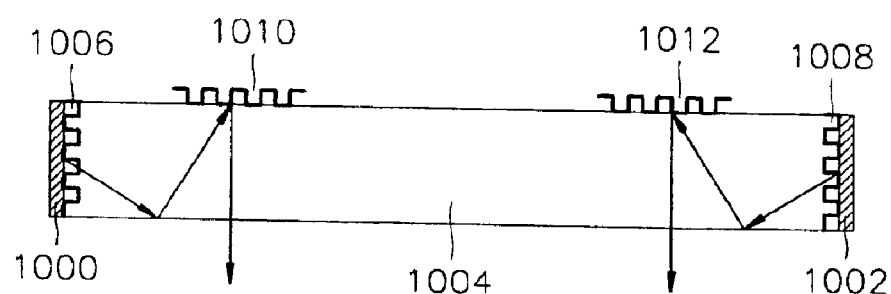
FIGS. 10A and 10B show other embodiments of a wearable display system according to the present invention in which display panels are attached to both sides of a waveguide.

FIG. 10A shows an embodiment of a wearable display system having display panels mounted on both ends of a waveguide. In this structure, display panels 1000 and 1002 are placed at opposite ends of a waveguide 1004, not on the sides thereof. First gratings 1006 and 1008 are installed parallel to the display panels 1000 and 1002. Second gratings 1010 and 1012, which are conjugates of the first gratings 1006 and 1008, are placed on the opposite side of the eyes of a user near the center of the waveguide 1004. Light of a signal emitted from the display panels 1006 and 1008 is transmitted into the waveguide 1004 through the first gratings 1006 and 1008, and the transmitted light is incident upon the second gratings 1010 and 1012 at the same angle as the transmission angle. The light which is incident on the second gratings 1010 and 1012 is reflected at the same angle as the incidence angle at the first gratings 1006 and 1008, and allows the reflected light to head for the eyes of the user. On the side of the waveguide 1004 with the user's eyes, magnifying lenses (not shown) are placed to magnify an image. In this embodiment, the first gratings 1006 and 1008 are transmission type gratings, and the second gratings 1010 and 1012 are reflection type gratings.

Figure 10B:
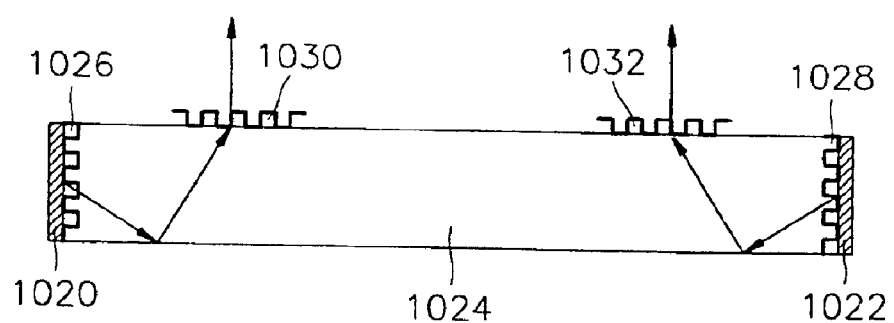

FIG. 10B is another embodiment of the wearable display system illustrated in FIG. 10A, i.e., the structure is the same, but the types of gratings are different. As in FIG. 10A, display panels 1020 and 1022 are positioned at the both ends of a waveguide 1024, not on the sides thereof, and first gratings 1026 and 1028 are installed parallel to the display panels 1020 and 1022. Second gratings 1030 and 1032, which are conjugates of the first gratings 1026 and 1028, are placed on the side of the eyes of a user near the center of the waveguide 1024. Light emitted from the display panels 1020 and 1022 is transmitted into the waveguide 1024 at a predetermined angle by the first gratings 1026 and 1028, and the transmitted light is incident upon the second gratings 1030 and 1032 at the same angle as the transmission angle at the first gratings 1026 and 1028. The light which is incident on the second gratings 1030 and 1032 is transmitted at the same angle as the incidence angle at the first gratings 1026 and 1028 and heads toward the eyes of the user. The transmitted light is magnified by magnifying lenses (not shown) attached to the outer sides of the second gratings 1030 and 1032. In this embodiment, the first gratings 1026 and 1028 and the second gratings 1030 and 1032 are all transmission type gratings.

Figure 11:
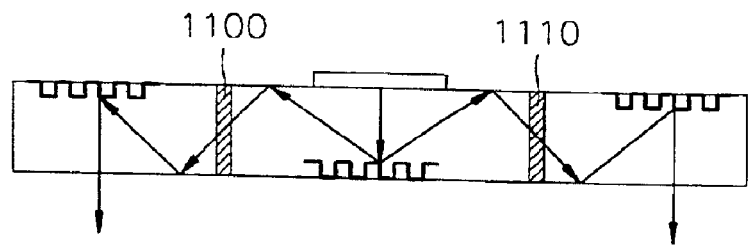
FIG. 11 shows a wearable display system according to the present invention adopting a shutter to realize a three-dimensional image.

FIG. 11 illustrates a wearable display system according to the present invention, which adopts a shutter to realize a three-dimensional image. The example of FIG. 11 is similar to the embodiment of FIG. 8E and generates a three-dimensional image. A shutter can be applied to all of the wearable display systems having the structures described above. Shutters 1100 and 1110 to block light propagating in both directions of a waveguide are alternately opened and closed at different times so that the same image reaches each eye of a user at a different time, thereby causing a three-dimensional effect. Although not shown in FIG. 11, the wearable display system having a shutter on only one side of the right and left sides can produce the same three-dimensional effect.

As described above, a three-dimensional image is realized when the same image reaches the eyes of a user with a time difference. In the event that media having different refractive indexes are used as left and right waveguides through which light propagates, the lattice of the left and right gratings is differently spaced. Alternately, the number of the left and right gratings is differently set, left and right diffraction angles become different from each other so that the propagation distance of light changes. As a result, a time difference occurs in the final signal that enters the user's eyes, thereby generating the three-dimensional image. When using a waveguide having different media on the right and left sides, the second and third gratings must be designed in consideration of the diffraction angle of light incident on the first gratings that are different on the right and left sides depending on the type of media of a waveguide. Further, the diffraction angle must be considered in designing gratings when the number of left and right gratings differs. At that time, a waveguide media must be selected and the gratings must be designed under the assumption that the diffraction angle is made when total internal reflection occurs. Another way to achieve a three-dimensional image is to display the same signal to the eyes of the user using two display panels with a predetermined time difference.

Figure 12A:
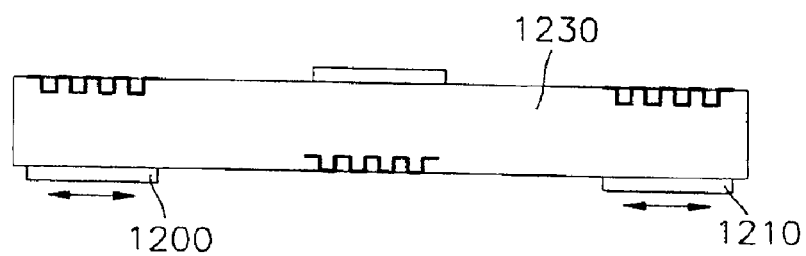
FIGS. 12A and 12B illustrate an application of controlling an inter-pupillary distance (IPD) in a wearable display system according to the present invention.

FIG. 12A shows an example of a wearable display system according to the present invention, which can control an inter-pupillary distance (IPD). The IPD of most adult men and women ranges from 50 mm to 74 mm. If a user wears a wearable display system designed for an IPD different from that of the user, the left and right images look different and overlap each other. As a result, eye fatigue increases compared to when wearing a wearable display system that fits the user's IPD. Thus, in order to adjust the IPD to make an image appear clearly, magnifying lenses 1200 and 1210 of a wearable display system can be moved to positions corresponding to the pupils of the eyes.

Figure 12B:
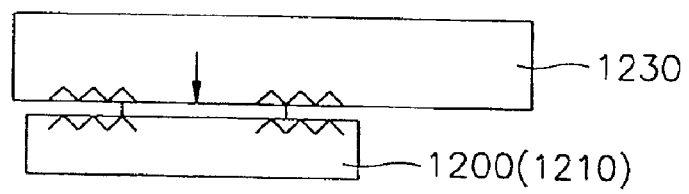

FIG. 12B illustrates an example of a wearable display system including a waveguide 1230 having a saw-toothed part and saw-toothed magnifying lenses 1200 and 1210 that can be combined with or separated from the waveguide 1230, which allows a user to move the magnifying lenses 1200 and 1210 a predetermined distance along the waveguide 1230. Here, the width of the magnifying lenses 1200 and 1210 must be narrower than that of a grating to diffract a signal, and further, the magnifying lenses 1200 and 1210 must be movable only within a distance the same as the width of the grating.

Figure 13:
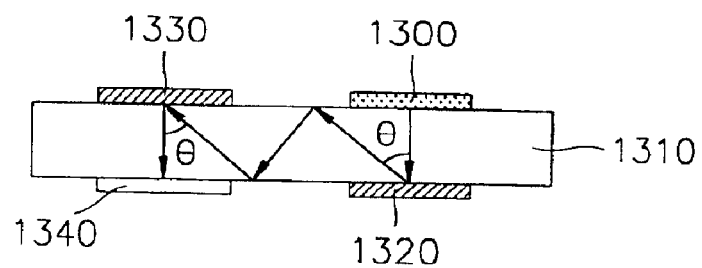
FIG. 13 shows an embodiment of a wearable display system according to the present invention having a monocular structure.

FIG. 13 is an embodiment of a wearable display system having a monocular structure. The monocular wearable display system employs the same structure and principles as the binocular display system of FIG. 5 except that it allows a user to look at an image with only one eye. The monocular display system comprises a display panel 1300, a waveguide 1310, a first grating 1320, a second grating 1330 and a magnifying lens 1340. The display panel 1300 outputs a signal received from a predetermined signal source (not shown) via a wire or radio. The waveguide 1310 allows a signal emitted from the display panel 1300 to propagate in one direction. The first and second gratings 1320 and 1330 diffract a signal passing through the waveguide 1310 and finally allow the signal to head toward the eyes of the user. Here, the first grating 1320 and the second grating 1330 are conjugates as described above, which means that when light incident on the first grating 1320 at a predetermined incidence angle is diffracted at a predetermined angle, the light propagates through the waveguide 1310, is incident on the second grating 1330 at the same angle as the diffraction angle at the first grating 1320, and is diffracted at the same angle as the predetermined angle of incidence at the first grating 1320. The magnifying lens 1340 magnifies a signal that emits from the waveguide 1310 so that the image appears larger to the user.

FIGS. 14A–14H illustrate various possible embodiments of a monocular wearable display system depending on the type of grating and arrangement thereof on the waveguide.

Figure 14A:
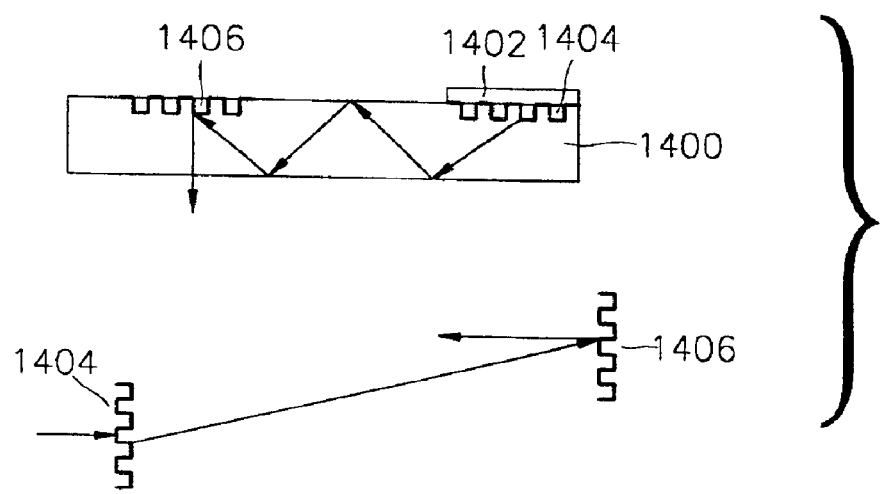
FIGS. 14A to 14H show various possible embodiments of a wearable display system according to the present invention having a monocular structure, depending on the types of gratings and the arrangement of the gratings on a waveguide.

FIG. 14A shows the structure of a monocular wearable display system in which a display panel 1402 and first and second gratings 1404 and 1406 are placed on a waveguide 1400 on the opposite side of the eye of a user. Light emitted from the display panel is incident on the first grating 1404 at a predetermined angle and then is transmitted in the left direction within the waveguide 1400 via the first grating 1404 and then is incident on the second grating 1406, which is the conjugate of the first grating 1404, at the same angle as the transmission angle at the first grating 1404. Light incident on the second grating 1406 is reflected at the same angle as the incidence angle at the first grating 1404 and heads toward the eye of the user. On the user' eye side of the waveguide 1400, a magnifying lens (not shown) is installed and allows the user to view a magnified signal. In this embodiment, the first grating 1404 is a transmission type grating and the second grating 1406 is a reflection type grating.

Figure 14B:
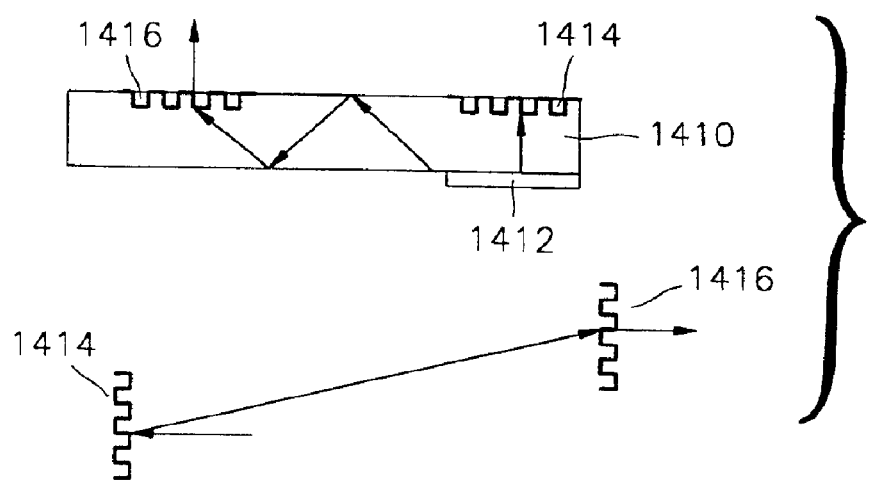

FIG. 14B shows a monocular wearable display system where a display panel 1412 is placed on the opposite side of the eye of a user and first and second gratings 1414 and 1416 are installed on the side of a waveguide 1410 through which a signal is transmitted to the eye of the user. Light incident on the first grating 1414 at a predetermined incidence angle is reflected toward the left direction of the waveguide 1410 at a predetermined reflection angle. The reflected light propagates in the waveguide 1410 and is incident on the second grating 1416, which is the conjugate of the first grating 1414, at the same angle as the reflection angle at the first grating 1414. The incident light is transmitted out of the second grating 1416 at the same angle as the predetermined incidence angle at the first grating 1414 and heads toward the eye of the user. A predetermined magnifying lens (not shown) is attached to the second grating 1416 and magnifies a signal to be transmitted. In this embodiment, the first grating 1414 is a reflection type grating and the second grating 1416 is a transmission type grating.

Figure 14C:
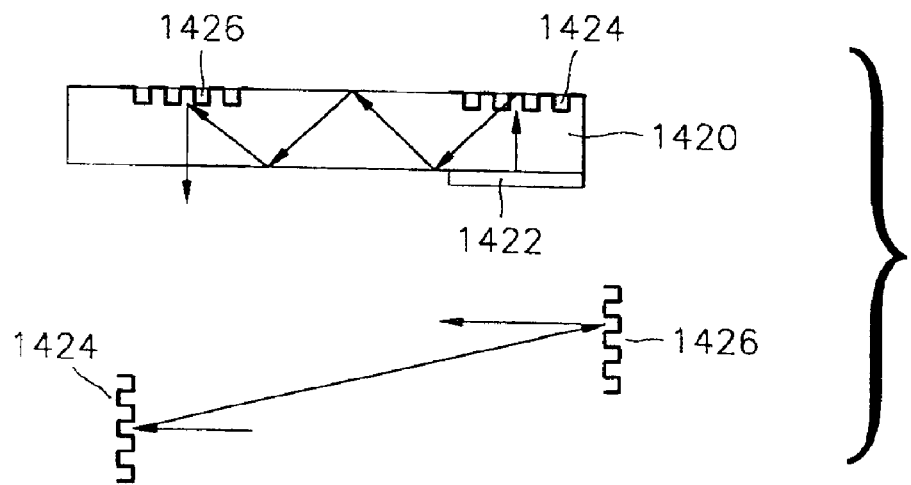

FIG. 14C shows a monocular wearable display system where a display panel 1422 is placed on the side of the eye of a user and first and second gratings 1424 and 1426 are installed on the side of a waveguide 1420 opposite to the side through which a signal is transmitted to the eye of the user. Light, which is emitted from the display panel 1422 and is incident on the first grating 1424 at a predetermined incidence angle via the waveguide 1420, is reflected at a predetermined reflection angle in the left direction of the waveguide 1420. The reflected light propagates in the left direction of the waveguide 1420 and then is incident on the second grating 1426, which is the conjugate of the first grating 1424, at the same angle as the reflection angle at the first grating 1424. Light incident on the second grating 1426 is reflected and propagates toward the eye of the user at the same angle as the incidence angle at the first grating 1424. A magnifying lens (not shown) is attached to the surface of the waveguide 1420 and allows the user to view a magnified signal. In this embodiment, the first and second gratings 1424 and 1426 are all reflection type gratings.

Figure 14D:
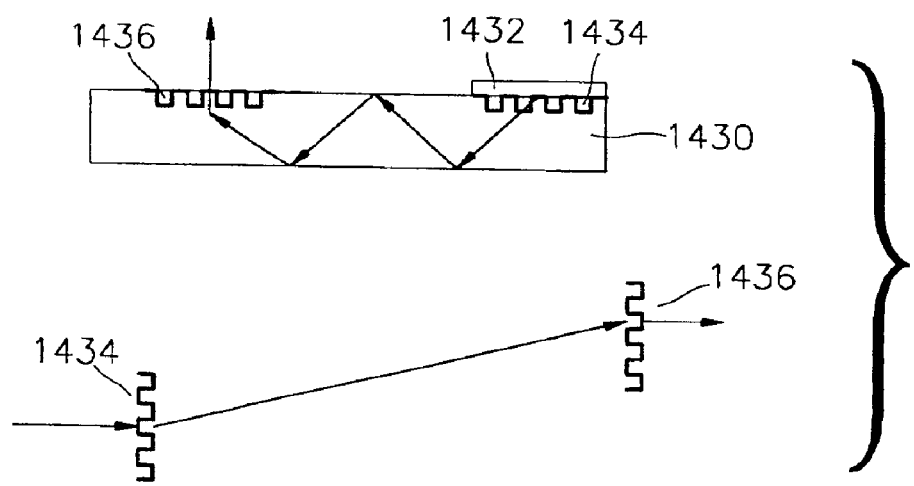

FIG. 14D shows the structure of a monocular wearable display system where a display panel 1432, and first and second gratings 1434 and 1436 are installed on the side of a waveguide 1430 through which a signal is transmitted to the eye of a user. Light of a signal, which is emitted from the display panel 1432 and is incident on the first grating 1434 at a predetermined incidence angle, is transmitted at a predetermined transmission angle toward the left direction within the waveguide 1430. The transmitted light propagates in the waveguide 1430 and is incident on the second grating 1436, which is the conjugate of the first grating 1434, at the same angle as the transmission angle at the first grating 1434. The incident light is transmitted through the second grating 1436 at the same angle as a predetermined incidence angle at the first grating 1434 and propagates toward the eye of the user. A magnifying lens (not shown) is attached to the second grating 1436 and magnifies a signal to be transmitted. In this embodiment, the first and second gratings 1434 and 1436 are all transmission type gratings.

Figure 14E:
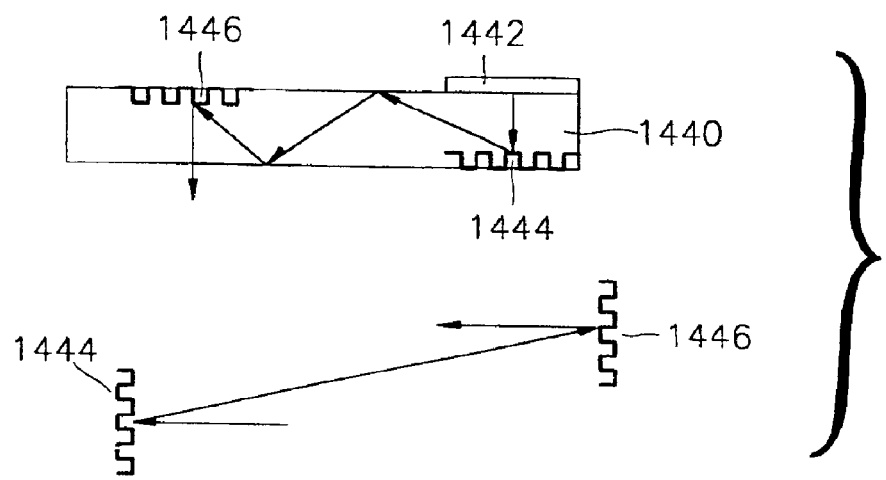

FIG. 14E shows the structure of a monocular wearable display system where a display panel 1442 and a second grating 1446 are placed on the opposite side as the eye of a user and a first grating 1444 is installed on the side of the waveguide 1440 through which a signal is transmitted to the eye of the user. Light, which is emitted from the display panel 1442 and is incident on the first grating 1444 at a predetermined incidence angle via the waveguide 1440, is reflected to the left at a predetermined reflection angle by the first grating 1444. The reflected light propagates to the left of the waveguide 1440 and is incident on the second grating 1446, which is the conjugate of the first grating 1444, at the same angle as the reflection angle at the first grating 1444. The incident light is reflected by the second grating 1446 at the same angle as the predetermined incidence angle at the first grating 1444 and propagates toward the eye of the user. A magnifying lens (not shown) is attached to the side of the waveguide 1440 and allows the user to view a magnified signal. In this embodiment, the first and second gratings 1444 and 1446 are all reflection type gratings.

Figure 14F:
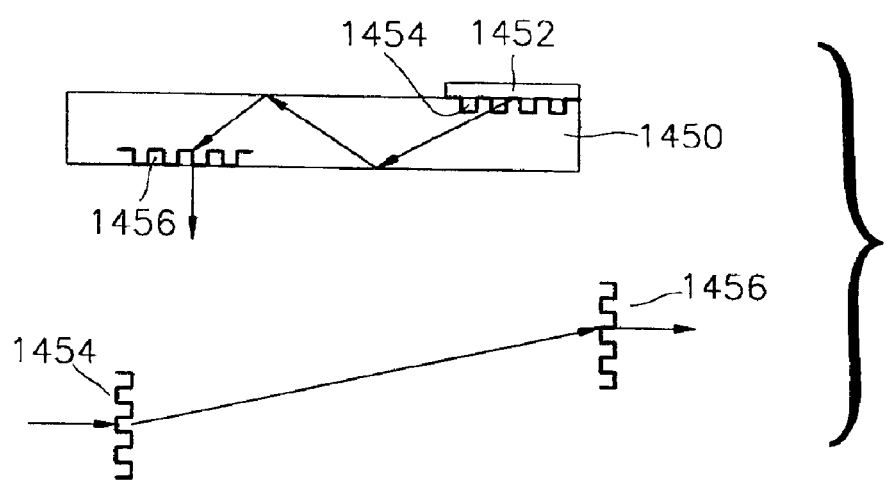

FIG. 14F shows the structure of a monocular wearable display system where a display panel 1452 and a first grating 1454 are placed on the opposite side of the eye of a user, and a second grating 1456 is installed on the side of a waveguide 1450 through which a signal is transmitted to the eye of the user. Light of a signal, which is incident on the first grating 1454 from the display panel 1452 at a predetermined incidence angle, is transmitted toward the left direction within the waveguide 1450 at a predetermined transmission angle. The transmitted light propagates in the waveguide 1450 and is incident on the second grating 1456, which is the conjugate of the first grating 1454, at the same angle as the transmission angle at the first grating 1454. The incident light is transmitted through the second grating 1456 at the same angle as the predetermined incidence angle at the first grating 1454 and propagates toward the eye of the user. A magnifying lens (not shown) is attached to the second grating 1456 and magnifies a signal to be transmitted. In this embodiment, the first and second gratings 1454 and 1456 are all transmission type gratings.

Figure 14G:
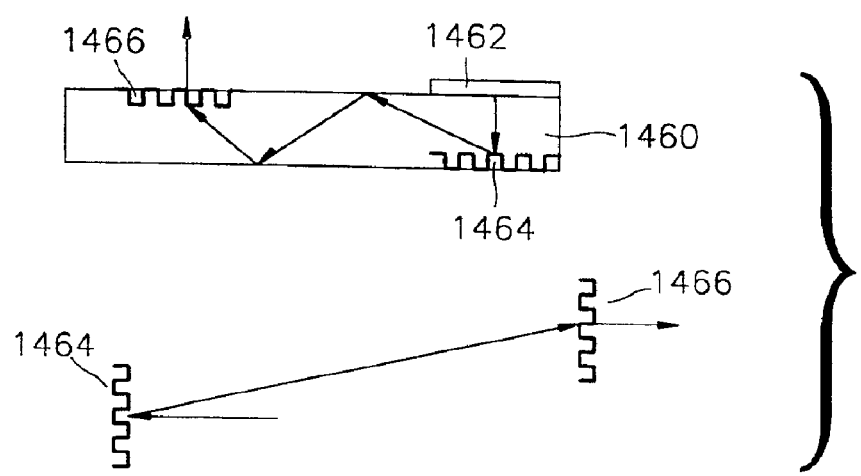

FIG. 14G shows the structure of a monocular wearable display system where a display panel 1462 and a second grating 1466 are placed on the side of a waveguide 1460 opposite to the side through which a signal is transmitted to the eye of a user, and a first grating 1464 is also on the opposite side from the user's eye. Light which is incident on the first grating 1464 at a predetermined incidence angle via the waveguide 1460, is reflected toward the left direction at a predetermined reflection angle. The reflected light propagates in the waveguide 1460 and then is incident on the second grating 1466, which is the conjugate of the first grating 1464, at the same angle as the reflection angle at the first grating 1464. The incident light is transmitted through the second grating 1466 at the same angle as the predetermined incidence angle at the first grating 1464 and travels toward the eye of the user. A magnifying lens (not shown) is attached to the second grating 1466 and magnifies a signal to be transmitted. In this embodiment, the first grating 1464 is a reflection type grating and the second grating 1466 is a transmission type grating.

Figure 14H:
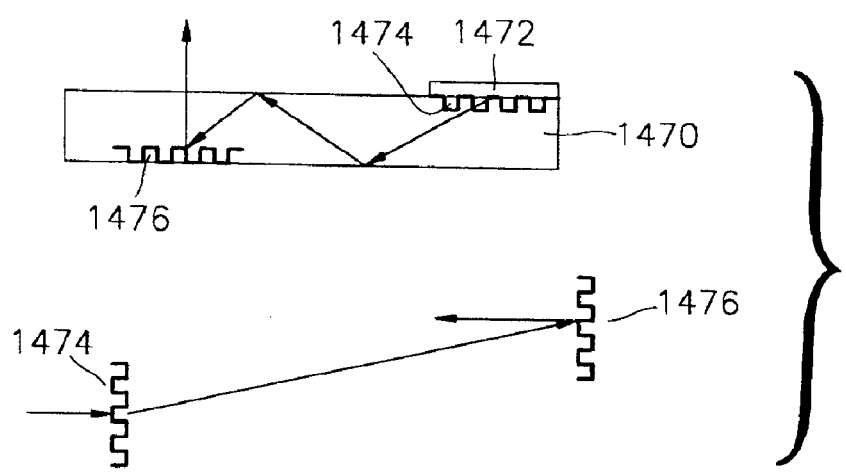

FIG. 14H shows the structure of a monocular wearable display side system where a display panel 1472 and a first grating 1474 are placed on the side of the eye of a user and a second grating 1476 is installed on the side of a waveguide 1470 through which a signal is transmitted to the eye of the user. Light transmitted into the waveguide 1470 propagates in the left direction of the waveguide 1470 and then is incident on the second grating 1476, which is the conjugate of the first grating 1474, at the same angle as the transmission angle at the first grating 1474. Light incident on the second grating 1476 is reflected at the same angle as the incidence angle at the first grating 1474 and propagates toward the eye of the user. A magnifying lens (not shown) is attached to the surface of the waveguide 1470 and allows the user to view a magnified signal. In this embodiment, the first grating 1474 is a transmission type grating and the second 1466 is a reflection type grating.

As described above, it is noted that a variety of monocular wearable display systems can be realized depending on the arrangement of a display panel and gratings on a waveguide. Accordingly, it is possible to derive other embodiments that have the same structure as the above-described embodiments, but the propagation direction of light is different, i.e., light propagates in the right direction.

Figure 15A:
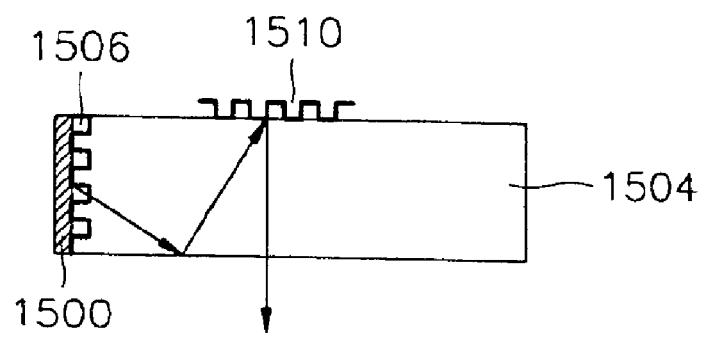
FIGS. 15A and 15B show other embodiments of a wearable display system according to the present invention having a monocular structure.

FIG. 15A is another embodiment of a monocular wearable display system. In this embodiment, a display panel 1500 is placed on the end of a waveguide 1504 and a first grating 1506 is located parallel to the display panel 1500. A second grating 1510, which is the conjugate of the first grating 1506, is positioned on the opposite side of the eye of a user at the center of the waveguide 1504. Light of a signal emitted from the display panel 1500 is incident on the first grating 1506 at a predetermined incidence angle and then is transmitted into the waveguide 1504 at a predetermined transmission angle via the first grating 1506. The transmitted light is then incident on the second grating 1510 at the same angle as the transmission angle. Light incident on the second grating 1510 is reflected at the same angle with respect to the second grating 1510 as the incidence angle at the first grating 1506, and propagates toward the eye of the user. A magnifying lens (not shown) such as an eyepiece is attached to the surface of the waveguide 1504 where the reflected light arrives, and magnifies the signal. In this embodiment, the first grating 1506 is a transmission type grating and the second grating 1510 is a reflection type grating.

Figure 15B:
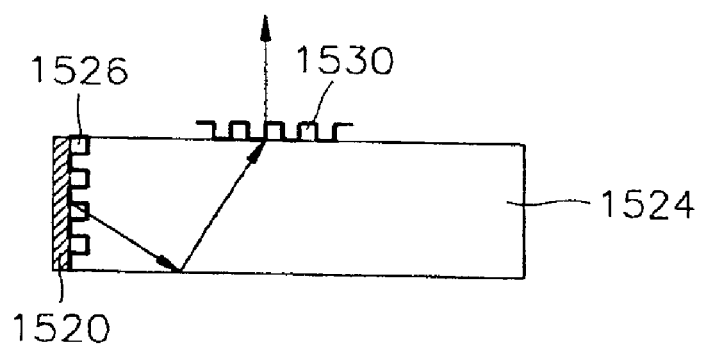

FIG. 15B is still another embodiment of a monocular wearable display system that has the same structure as that of FIG. 15A, but adopts different types of gratings. Also, in this embodiment, a display panel 1520 is placed on the end of a waveguide 1524 and a first grating 1526 is located parallel to the display panel 1520. A second grating 1530, which is the conjugate of the first grating 1526, is placed in the direction of an eye of a user at the center of the waveguide 1524. Light of a signal which is emitted from the display panel 1520 is incident on the first grating 1526 at a predetermined incidence angle, and then is transmitted into the waveguide 1524 at a predetermined transmission angle via the first grating 1526, and the transmitted light is incident on the second grating 1530 at the same angle as the transmission angle. Light incident on the second grating 1530 is reflected at the same angle with respect to the second grating 1530 at the incidence angle at the first grating 1526, and travels toward the eye of the user. A magnifying lens (not shown) is attached to the surface of the waveguide 1524 where the reflected light arrives and magnifies the signal. In this embodiment, the first and second gratings 1526 and 1530 are transmission type gratings.

In FIGS. 15A and 15B, a display panel is positioned at the left end of a waveguide. However, the position of a display panel can vary. For example, a first grating does not have to be placed at the same end of the waveguide.

A three-dimensional image can be realized by wearing two of the above-described monocular wearable display systems at the same time, one on each eye. Thus, the same signal is displayed with a time difference and a three-dimensional image is therefore achieved.

Figure 16A:
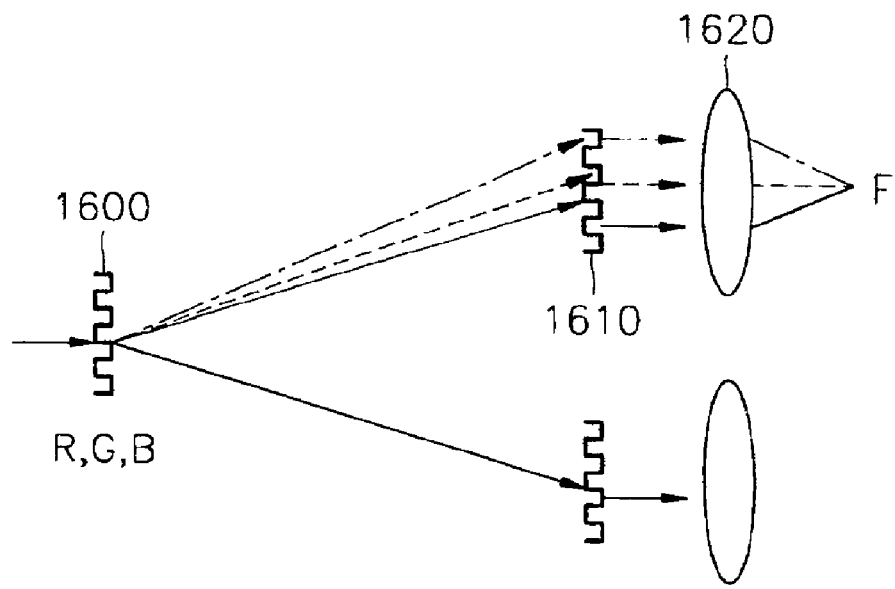
FIGS. 16A and 16B illustrate ways in which chromatic aberration is removed by gratings used in the present invention.
Figure 16B:
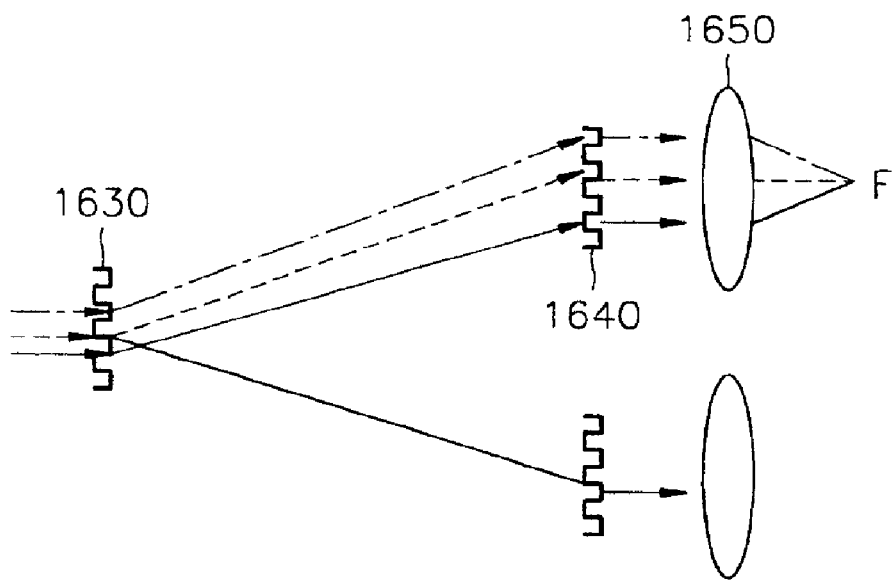

FIGS. 16A and 16B illustrate the removal of a chromatic aberration by the gratings used in the present invention. Chromatic aberration occurs when the focuses of the R, G and B components of an incident color signal are not converged on one spot, that is, different color images are formed at different places. In the event that a color signal propagates via the gratings used in the present invention, different colors can be focused at one place by combining gratings having a conjugate relationship.

Referring to FIG. 16A, a first grating 1600 and a second grating 1610 are both transmission type gratings and R, G and B color components of an incident signal are transmitted through the first grating 1600 at different transmission angles. Each of the transmitted color components is incident on the second grating 1610 at the same angle as the transmission angle at the first grating 1600, and is transmitted through the second grating 1610 at the same incidence angle as that at the first grating 1600. The color components are then incident in parallel with the other color components on a magnifying lens 1620, such as an eyepiece. Each of the color components that reach the magnifying lens 1620 in parallel is focused with the same focal distance F via the magnifying lens 1620, thereby removing chromatic aberration.

FIG. 16B shows R, G and B components of an incident signal incident on a first grating 1630 at a predetermined angle, in the case of first and second transmission type gratings 1630 and 1640. The R, G and B components which are incident on the first grating 1630 at the predetermined angle propagate at different transmission angles and are incident on the second grating 1640 at the same angle as the transmission angle. Each of the incident color components passes through the second grating 1640 at the same angle as the predetermined incidence angle at the first grating 1630, and then is incident on a magnifying lens 1650, such as an eyepiece, in parallel. The magnifying lens 1650 allows the color components that are incident in parallel to be focused at the same focal distance F, thereby removing chromatic aberration. The removal of chromatic aberration is obtained by the above-described gratings having a conjugate relationship.

The above-mentioned wearable display system can be achieved by incorporating a waveguide and gratings, or a waveguide and an eyepiece, or a waveguide and gratings and an eyepiece into one single-body.

The above-described waveguide is made of glass or plastic or particularly, acryl substance (PMMA).

The magnifying lens can be manufactured from a holographic optical element (HOE) or a diffraction optical element (DOE). A diffraction lens, a refractive lens, a combination of a diffraction lens and a refractive lens, or aspherics is used as the magnifying lens.

Figure 17A:
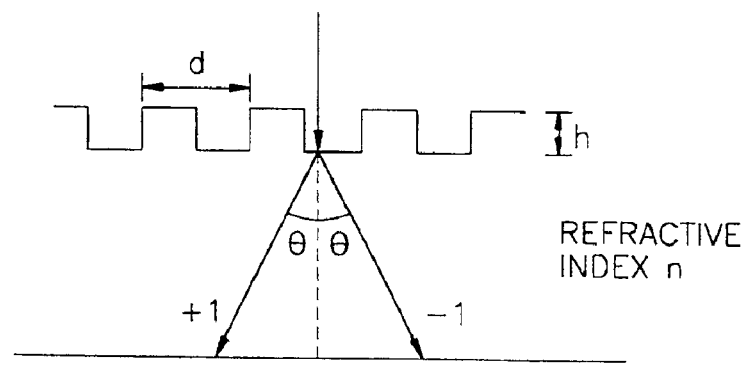
FIGS. 17A to 17C show gratings suitable for the present invention.
Figure 17B:
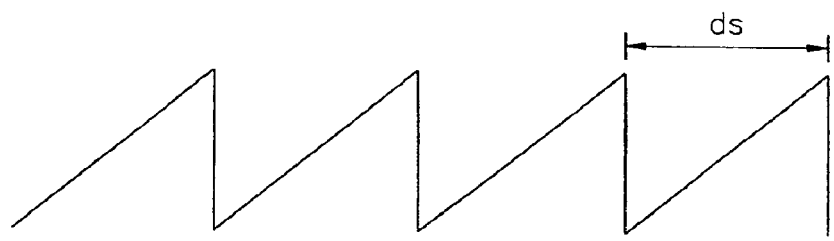
Figure 17C:
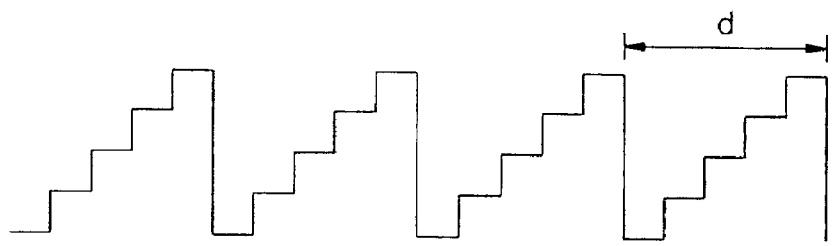
Figure 18A:
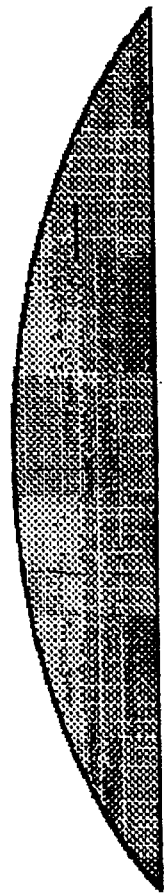
FIGS. 18A to 18E illustrate examples of various ocular lenses.
Figure 18B:
Figure 18C:
Figure 18D:
Figure 18E:

FIGS. 17A to 17C illustrate types of gratings that can be used in the present invention. FIG. 17A shows a rectangular binary grating to diffract light in both directions. FIG. 17B shows a brazing-type grating that is saw-toothed and diffracts light only in one direction. FIG. 17C shows a grating that is multi-layered and is designed to enhance the efficiency of diffraction. In addition to these types, a hologram grating can be adopted. These gratings can be manufactured from an HOE or a DOE.

FIGS. 18A to 18E illustrate a variety of eyepieces.

According to the above-described present invention, a more lightweight and compact wearable display system can be realized by minimizing the number of optical components, and the complexity and cost in manufacturing the display system can be reduced. In addition, the display system can be produced on a large scale by incorporating a waveguide, gratings and an eyepiece into one single body, and further, chromatic aberration can be removed by conjugate gratings.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A wearable display system having a display panel to output at least one signal, comprising:
   at least one waveguide to guide a propagation of the at least one signal output from the at least one display panel;
   a plurality of gratings to diffract the at least one signal propagating through the at least one waveguide;
   at least one magnifying lens to magnify the at least one signal diffracted at least one of the plurality of gratings; and
   at least one shutter to alternately block a plurality of the signals output by the display panel in the waveguide, to produce a three-dimensional image.

2. A wearable display system having a display panel to output at least one signal, comprising:
   at least one waveguide to guide a propagation of the at least one signal output from the at least one display panel;
   a plurality of gratings to diffract the at least one signal propagating through the at least one waveguide; and
   at least one magnifying lens to magnify the at least one signal diffracted by at least one of the plurality of gratings, wherein the at least one magnifying lens is movable along a predetermined length of the at least one waveguide.

3. A wearable display system having a binocular structure, comprising:
   a waveguide through which a signal propagates;
   a display panel at a center of the waveguide, the display panel to output the signal;
   a first grating to diffract the signal output from the display panel and incident upon the first grating at a predetermined incidence angle, in opposite directions of the waveguide at a predetermined diffraction angle;
   a plurality of second gratings to diffract the signal diffracted by the first grating and incident upon the second gratings at the predetermined diffraction angle at the first grating, at the predetermined incidence angle at the first grating; and
   a plurality of magnifying lenses to magnify the signal diffracted by corresponding ones of the second gratings.

4. The wearable display system according to claim 3, wherein the first grating is adjacent to the display panel and is a transmission type display panel to transmit the signal output from the display panel and incident upon the first grating at the predetermined incidence angle, in the opposite directions within the waveguide at a predetermined transmission angle.

5. The wearable display system according to claim 4, wherein each of the second gratings is a reflection type grating to reflect the signal propagating through the waveguide and incident upon the second gratings at the predetermined transmission angle at the first grating, at the predetermined incidence angle at the first grating.

6. The wearable display system according to claim 4, wherein each of the second gratings is a transmission type grating to transmit the signal propagating through the waveguide and incident upon the second gratings at the predetermined transmission angle at the first grating, at the predetermined incidence angle at the first grating.

7. The wearable display system according to claim 4, wherein the plurality second gratings comprises:
   one of the second gratings of a transmission type to transmit the signal propagating through the waveguide and incident upon the transmission type second grating at the predetermined transmission angle at the first grating, at the predetermined incidence angle at the first grating, and
   another one of the second gratings of a reflection type to reflect the signal propagating through the waveguide and incident upon the reflection type grating at the predetermined transmission angle at the first grating, at the predetermined incidence angle at the first grating.

8. The wearable display system according to claim 3, wherein the first grating is positioned opposite to the display panel in the waveguide and is a reflection type grating to reflect the signal output from the display panel and incident upon the first grating at the predetermined incidence angle, at a predetermined reflection angle in the opposite directions of the waveguide.

9. The wearable display system according to claim 8, wherein each of the second gratings is a transmission type grating to transmit the signal propagating through the waveguide and incident upon the second gratings at the predetermined reflection angle at the first grating, at the predetermined incidence angle at the first grating.

10. The wearable display system according to claim 8, wherein each of the second gratings is a reflection type grating to reflect the signal propagating through the waveguide and incident upon the second gratings at the predetermined reflection angle at the first grating, at the predetermined incidence angle at the first grating.

11. The wearable display system according to claim 8, wherein the plurality of second gratings comprises:
   one of the second gratings of a transmission type to transmit the signal propagating through the waveguide and incident upon the transmission type second grating at the predetermined diffraction angle at the first grating, at the predetermined incidence angle at the first grating, and
   another one of the second gratings of a reflection type to reflect the signal propagating through the waveguide and incident upon the reflection type second grating at the predetermined transmission angle at the first grating, at the predetermined incidence angle at the first grating.

12. The wearable display system according to claim 3, further comprising at least one shutter to alternately block a plurality of the signals output by the display panel within the waveguide, to produce a three-dimensional image.

13. The wearable display system according to claim 3, wherein each of the magnifying lenses is movable along a predetermined length of the waveguide.

14. A wearable display system having a binocular structure, comprising:
   a waveguide through which signals propagate;
   two display panels respectively placed on opposite sides of the waveguide, each of the display panels to output one of the signals;
   two first gratings to diffract the signals output from the display panels and incident upon the first gratings at a predetermined incidence angle, at a predetermined diffraction angle in opposite directions of the waveguide;
   second gratings to diffract the signals propagating through the waveguide and incident upon the second gratings at the predetermined diffraction angle at the first gratings, at the predetermined incidence angle at the first gratings; and
   magnifying lenses to magnify the signals diffracted by corresponding ones of the second gratings.

15. The wearable display system according to claim 14, wherein each of the first gratings is located adjacent to a respective one of the display panels, and is a transmission type grating to transmit the signal output from the respective one of the display panels and incident upon the first gratings at the predetermined incidence angle, at a predetermined transmission angle in one of the opposite directions of the waveguide.

16. The wearable display system according to claim 15, wherein each of the second gratings is a reflection type grating to reflect the signals propagating through the waveguide and incident upon the second gratings at the predetermined transmission angle at the first gratings, at the predetermined incidence angle at the first gratings.

17. The wearable display system according to claim 15, wherein each of the second gratings is a transmission type grating to transmit the signals propagating through the waveguide and incident upon the second gratings at the predetermined transmission angle at the first gratings, at the predetermined incidence angle at the first gratings.

18. The wearable display system according to claim 15, wherein the two second gratings comprise:
   one of the second gratings of a transmission type to transmit the signals propagating through the waveguide and incident upon the transmission type second grating at the predetermined transmission angle at the first gratings, at the predetermined incidence angle at the first gratings, and
   another one of the second gratings is a reflection type grating to reflect the signals propagating through the waveguide and incident upon the reflection type second grating at the predetermined transmission angle at the first gratings, at the predetermined incidence angle at the first gratings.

19. The wearable display system according to claim 14, wherein each of the first gratings is positioned opposite to a respective one of the display panels in the waveguide and is a reflection type grating to reflect the signal output from the respective display panel and incident upon the first gratings at the predetermined incidence angle, at a predetermined reflection angle in one of the opposite directions of the waveguide.

20. The wearable display system according to claim 19, wherein each of the second gratings is a reflection type grating to reflect the signals propagating through the waveguide and incident upon the second gratings at the predetermined reflection angle at the first gratings, at the predetermined incidence angle at the first gratings.

21. The wearable display system according to claim 19, wherein each of the second gratings is a transmission type grating to transmit the signals propagating through the waveguide and incident upon the second gratings at the predetermined reflection angle at the first gratings, at the predetermined incidence angle at the first gratings.

22. The wearable display system according to claim 19, wherein the two second gratings comprise:
   one of the second gratings of a transmission type grating to transmit the signals propagating through the waveguide and incident upon the transmission type second grating at the predetermined reflection angle at the first gratings, at the predetermined incidence angle at the first gratings, and
   another of the second gratings is a reflection type grating to reflect the signals propagating through the waveguide and incident upon the reflection type second grating at the predetermined reflection angle at the first gratings, at the predetermined incidence angle at the first.

23. The wearable display system according to claim 14, wherein the two first gratings comprise:
   one of the first gratings located adjacent to a first one of the display panels and is a transmission type grating to transmit a one of the signals output from said first one of the display panels and incident upon the transmission type first grating at the predetermined incidence angle, at a predetermined transmission angle, and
   another of the first gratings is opposite to a second one of the display panels and is a reflection type grating to reflect a one of the signals output from said second one of the display panels and incident upon the reflection type first grating at the predetermined incidence angle, at a predetermined reflection angle.

24. The wearable display system according to claim 23, wherein each of the second gratings is a transmission type grating.

25. The wearable display system according to claim 23, wherein each of the second gratings is a reflection type grating.

26. The wearable display system according to claim 23, wherein one of the second gratings is a transmission type grating, and another one of the second gratings is a reflection type grating.

27. The wearable display system according to claim 14, further comprising at least one shutter to alternately block the signals in the waveguide to produce a three-dimensional image.

28. The wearable display system according to claim 14, wherein each of the magnifying lenses is movable along a predetermined length of the waveguide.

29. A wearable display system having a binocular structure, comprising:
   a waveguide through which signals propagate;
   two display panels respectively placed on both ends of the waveguide, the display panels to output the signals;

two first gratings located adjacent to the display panels, to respectively transmit the signals output from the display panels and incident on the first gratings at a predetermined incidence angle, into the waveguide at a predetermined transmission angle;

second gratings oriented perpendicular to the first gratings of the waveguide to diffract the signals propagating through the waveguide and incident upon the second gratings at the predetermined transmission angle at the first gratings, at the predetermined incidence angle at the first gratings; and magnifying lenses to magnify the signals diffracted by corresponding ones of the second gratings.

30. The wearable display system according to claim 29, wherein each of the second gratings is a reflection type grating to reflect the incident signals at the predetermined incidence angle at the first gratings.

31. The wearable display system according to claim 29, wherein each of the second gratings is a transmission type grating to reflect the incident signals at the incidence angle at the first gratings.

32. The wearable display system according to claim 29, wherein the display panels display the signals with a time difference with respect to each other to produce a three-dimensional image.

33. The wearable display system according to claim 29, further comprising at least one shutter to alternately block ones of the signals within the waveguide to produce a three-dimensional image.

34. The wearable display system according to claim 29, wherein the magnifying lenses are movable along a predetermined length of the waveguide.

35. A wearable display system having a monocular structure, comprising:

a waveguide through which a signal propagates;

a display panel placed either on a first end, or a second end opposite the first end, of the waveguide, the display panel to output the signal;

a first grating to diffract the signal output from the display panel and incident upon the first grating at a predetermined incidence angle into the waveguide at a predetermined diffraction angle;

a second grating oriented perpendicular to the first grating in the waveguide, the second grating to diffract the signal propagating through the waveguide and incident upon the second grating at the predetermined diffraction angle at the first grating, at the predetermined incidence angle at the first grating; and a magnifying lens to magnify the signal diffracted by the second grating.

36. The wearable display system according to claim 35, wherein the first grating is positioned opposite to the display panel in the waveguide and is a reflection type grating to reflect the signal output from the display panel and incident upon the first grating at the predetermined incidence angle, at a predetermined reflection angle within the waveguide.

37. The wearable display system according to claim 36, wherein the second grating is a transmission type grating to transmit the signal propagating through the waveguide and incident upon the second grating at the predetermined reflection angle at the first grating, at the predetermined incidence angle at the first grating.

38. The wearable display system according to claim 35, wherein the first grating is adjacent to the display panel, and the first grating is a transmission type grating to transmit the signal output from the display panel and incident upon the first grating at the predetermined incidence angle, within the waveguide at a predetermined transmission angle.

39. The wearable display system according to claim 38, wherein the second grating is a transmission type grating to transmit the signal propagating through the waveguide and incident upon the second grating at the predetermined transmission angle at the first grating, at the predetermined incidence angle at the first grating.

40. The wearable display system according to claim 38, wherein the second grating is a reflection type grating to reflect the signal propagating through the waveguide and incident upon the second grating at the predetermined transmission angle at the first grating, at the predetermined incidence angle at the first grating.

41. A wearable display system having at least one display panel to output at least one signal processed in a predetermined way, comprising:

at least one waveguide to guide a propagation of the at least one signal output from the at least one display panel;

a plurality of gratings to diffract the at least one signal propagating through the at least one waveguide; and at least one magnifying lens to magnify the at least one signal diffracted by the plurality of gratings, wherein the signal propagates to left and right eyes of a user with a time difference, thereby producing a three-dimensional image.

* * * * *

UNITED STATES PATENT AND TRADEMARK OFFICE
CERTIFICATE OF CORRECTION

PATENT NO. : 6,882,479 B2
DATED : April 19, 2005
INVENTOR(S) : Young-ran Song et al.

It is certified that error appears in the above-identified patent and that said Letters Patent is hereby corrected as shown below:

<u>Column 16,</u>
Line 26, after "plurality" insert -- of --.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,882,479 B2 | Page 1 of 1 |
| APPLICATION NO. | : 10/016685 | |
| DATED | : April 19, 2005 | |
| INVENTOR(S) | : Young-ran Song et al. | |

It is certified that error appears in the above-identified patent and that said Letters Patent is hereby corrected as shown below:

On the cover page under "References Cited U.S. Patent Documents" (56) insert:
6 611 385; Song, Young Ran; November 21, 2002--.

Signed and Sealed this

Twelfth Day of September, 2006

JON W. DUDAS
*Director of the United States Patent and Trademark Office*